Sept. 25, 1962  E. H. COOKE-YARBOROUGH  3,056,047
PULSE-RATE SENSITIVE INTEGRATING CIRCUITS SIMULTANEOUSLY
CHARGED BY PULSES AT UNKNOWN RATE AND
Filed May 11, 1959   DISCHARGED AT CONSTANT RATE 2 Sheets-Sheet 1

INVENTOR
EDMUND HARRY COOKE-YARBOROUGH
BY *Lawson and Taylor*

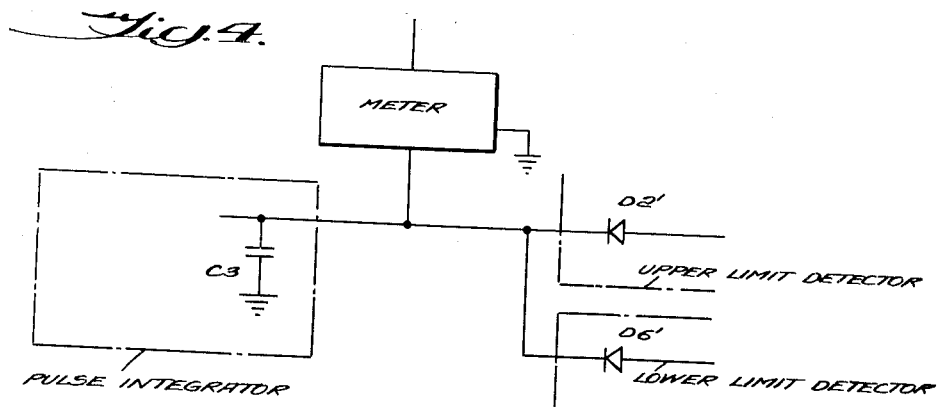
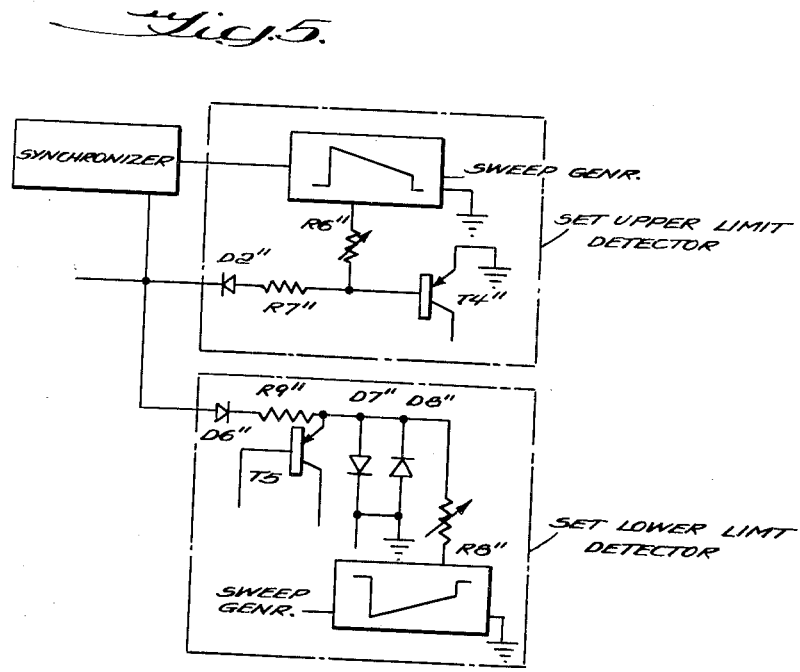

United States Patent Office 3,056,047
Patented Sept. 25, 1962

3,056,047
PULSE-RATE SENSITIVE INTEGRATING CIRCUITS SIMULTANEOUSLY CHARGED BY PULSES AT UNKNOWN RATE AND DISCHARGED AT CONSTANT RATE
Edmund Harry Cooke-Yarborough, Longworth, England, assignor to United Kingdom Atomic Energy Authority, London, England
Filed May 11, 1959, Ser. No. 812,368
Claims priority, application Great Britain May 16, 1958
5 Claims. (Cl. 307—88.5)

This invention relates to ratemeters for electrical pulses.

The pulses emitted by radioactive source occur randomly in time, so if an accurate estimate of the activity of a weak source is to be obtained, many pulses must be counted and the measurement may take a long time. In cases where it is only required to ascertain whether the activity of a source lies above or below a predetermined level, it is, in principle, only necessary to perform a long count when the activity of the source is close to the predetermined level, while sources which are much stronger or much weaker can, in principle, be disposed of by making a far less accurate measurement in a much shorter time. The present invention is intended to take advantage of this possibility.

One application is in the routine measurement of alpha-particle activity on the hands. Many pairs of hands must be tested in as short a time as possible and most are expected to be uncontaminated or only very lightly contaminated. The present invention allows hands which have very little activity to be tested very rapidly, and the same applies to heavily contaminated hands. Those hands whose activity lies close to the tolerance level require a longer counting period.

According to the present invention a ratemeter for electrical pulses comprises a store for said pulses, means for emptying the store at a rate corresponding to a given pulse rate, means for setting the store to an initial condition, and means for detecting when the nett stored pulse count has changed, in at least one direction, by a predetermined amount.

Said store may be the storage capacitor of an electronic integrating circuit, said emptying means withdrawing charge from said capacitor at a rate corresponding to the average rate of flow of charge into said capacitor at the given pulse rate, said setting means establishing an initial voltage across said capacitor, and said detecting means operating when the voltage in the capacitor has changed, in either direction, from said initial voltage to predetermined levels. Said electronic integrating circuit may be of the Miller type comprising a feedback loop including said capacitor, said emptying means comprising a resistor connected to withdraw a constant current from said capacitor.

Said predetermined voltage levels may be made to decrease with time towards said initial voltage, thereby ensuring that said detecting means will eventually operate whatever the pulse rate.

Alternatively means may be included for terminating the count after a fixed time if said detecting means has not meanwhile operated. Means may also be included for determining whether the voltage on said capacitor has increased or decreased from its initial value at the time when the count is terminated.

To enable the nature of the present invention to be more readily understood, attention is directed by way of example to the accompanying drawings wherein:

FIGS. 4 and 5 are schematic diagrams showing embodiments of the present invention.

Figure 1:
FIG. 1 is a circuit diagram illustrating the principle of the present invention.

The circuit shown in FIG. 1 comprises a capacitor C constituting a store, one side of which is earthed and which can be shorted by a switch S. It is arranged that each pulse detected causes a charge Q to flow into the capacitor. At the same time a continuous current $i$ is drawn from the capacitor. The value of $i$ is chosen so as to be equal to the average rate at which charge flows into the capacitor when the counting rate is exactly at a predetermined level, e.g. the tolerance level for hand contamination. Switch S is normally closed, keeping the capacitor voltage at zero, but opens at the beginning of the counting period. If the pulse rate is zero, the voltage across the capacitor changes rapidly in the negative direction and when it has reached a predetermined value $-V1$ an indicator operates to show that the activity is below the tolerance level. If the pulse rate is not zero, but is below the tolerance level, the approach of the capacitor voltage to $-V1$ will be delayed by each pulse. If, however, the pulse rate is far above the tolerance level, the capacitor will charge rapidly positive in a series of steps when the switch is opened and, when the voltage has reached a predetermined value $+V2$ another indicator will operate to indicate that the pulse rate is above the tolerance level.

Figure 2:
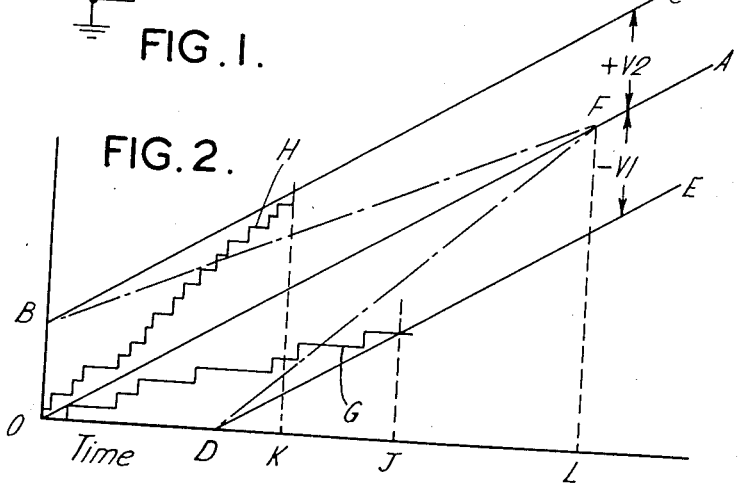
FIG. 2 is a graph illustrating the operation of the circuit of FIG. 1.

FIG. 2, which is a graph of cumulative count plotted against time, illustrates the above-described operation. In this graph the line OA represents the tolerance count-rate, the displacement between the parallel line DE and OA represents the voltage $-V1$, and the displacement between the parallel line BC and OA represents the voltage $+V2$. V1 is shown equal to V2 in this example. With zero pulse-rate, the voltage on C reaches the level $-V1$ in a time OD. If the pulse-rate is well below the tolerance level, the voltage on C will change as shown by plot G and will eventually reach the level $-V1$ in a time OJ. If the pulse-rate is well above the tolerance level, the voltage on C will change as shown by plot H and will eventually reach the level $+V2$ in a time OK.

The more nearly the pulse rate approaches the tolerance level, the longer will be the counting period before an indication is obtained. The same applies to pulse rates just above the tolerance level. If the mean counting rate were exactly equal to the tolerance level the count would continue indefinitely, were it not for the statistical fluctuations in the pulse rate. These will normally terminate the count eventually by causing one or other indicator to operate. The probability of this occurring increases steadily with the length of the counting period.

If desired, the maximum counting period can be limited in other ways. One method is to terminate the count after a given time, and to treat cases where neither a high nor a low indication has been obtained as either above or below tolerance as preferred. Alternatively such cases can be treated as above or below tolerance depending upon the trend at the time the count is stopped, e.g. by determining on which side of the tolerance line OA the cumulative count plot lies at that time. Another method is to make the voltages $-V1$ and $+V2$ decrease with time as shown by the lines DF and BF in FIG. 2, instead of remaining constant, so that an indication one way or the other is necessarily obtained in the time OL. It can be shown that for near-tolerance cases any of these methods will give results which are satisfactory from the aspects of accuracy and duration of testing period, by comparison with existing methods.

Owing to statistical fluctuations there is a small, but finite probability that an average pulse rate just above the predetermined level will nevertheless cause the low-level indicator to operate, and vice versa. These probabilities can be reduced as much as may be desired by increasing the values of V1 and V2, or by reducing the value of Q and reducing $i$ in proportion, or by increasing the value of C, but an increase in the average unterminated counting time will result.

Since V1 and V2 can be varied independently, the probability of incorrect above-tolerance indication can be made different from that of incorrect below-tolerance indication if desired.

Figure 3:
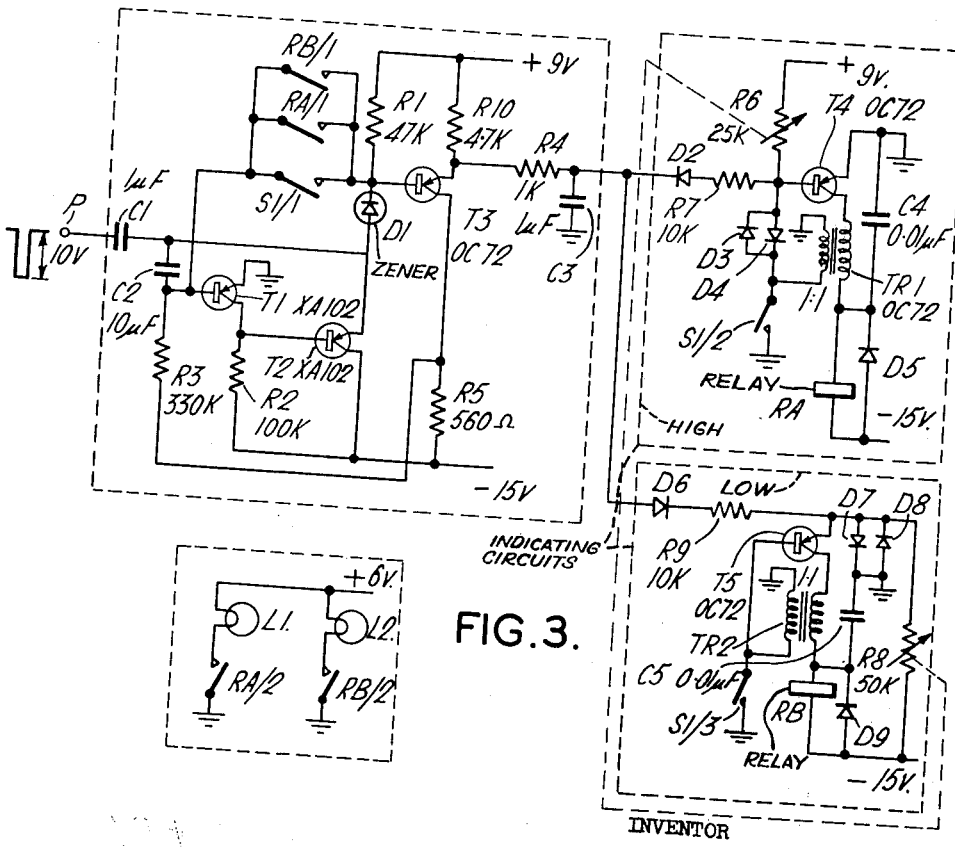
FIG. 3 is a circuit diagram of a ratemeter embodying the present invention.

The circuit shown in FIG. 3 is designed for a tolerance rate of 5 pulses/sec., the pulses being negative-going, of 10 v. amplitude and 100 μsec. wide. These pulses are applied via an input terminal P and capacitors C1 and C2 in series, to the base of a transistor T1 whose emitter is earthed. The collector of T1 is directly connected to the base of a transistor T2, and the emitter of T2 is connected to the junction of C1 and C2. The emitter of T2 is also connected through a 5 v. Zener diode D1 and a resistor R1 to +9 v. The Zener diode D1 serves to define the operating potentials in the T1, T2 circuit and, in particular, to define the initial voltage across C2 which forms a storage capacitor, as described below. A switch contact S1/1 of a switch S1 is connected between the base of T1 and the junction of D1 and R1.

The circuit so far described constitutes an integrating circuit and operates as follows. With S1/1 closed T1 and T2 both conduct with the base of T1 approximately at earth potential and the collector of T1 at approximately the same potential, −5 v., as the emitter of T2. There is 5 v. across C2.

If now S1/1 is opened and a 10 v. negative pulse applied to terminal P, a pulse of about 1 v. appears on the emitter of T2 ($C1:C2 \doteq 1:10$) cutting T2 off, and C1 and C2 charge up through the emitter-base diode of T1. At the end of the pulse the positive-going edge causes T2 to conduct and discharge C1, but T1 is cut off by this edge and C2 therefore retains the charge it has acquired. Thereafter T2 acts as an emitter-follower applying negative feedback to the base of T1 via C2, and the circuit assumes a new quiescent condition with the voltage across C2 now equal to 6 v. and the emitter voltage of T2 now equal to −6 v. Each subsequent input pulse similarly reduces the emitter voltage of T2 by approximately 1 v. It will be seen that the feedback loop comprising T1, T2 and C2 forms in effect a Miller-type integrating circuit.

The capacitor C2 corresponds to the capacitor C of FIG. 1. The current $i$ of FIG. 1 is supplied in FIG. 3 via a resistor R3 connected between the base of T1 and −15 v. so that, in the absence of input pulses, the T1–T2 circuit would operate in the manner of a Miller time-base, with a linear rise of voltage at the emitter of T2. It will be seen that, with the values shown in FIG. 3, the current $i$ is 50 μA., which is equivalent to a tolerance rate of 5 pulses/sec. (The charge acquired by C2 per pulse=10 v.×1 μf).

The output of the T1–T2 circuit is taken from the junction of R1 and D1 via a transistor T3 connected as an emitter-follower to a smoothing circuit comprising a resistor R4 and a capacitor C3. The voltage on C3 is approximately zero with S1/1 closed.

The resistor R3 is not in fact returned directly to the −15 v. line, but is taken to the collector of T3, and a small-value resistor R5 is connected between this collector and the −15 v. line. The effect of this arrangement is to render more linear the rise of voltage at the emitter of T2 produced by the current fed through R3. As the collector current of T1 increases, its base current also increases and tends to reduce the rate of change of voltage across C2. The arrangement shown compensates for this effect by simultaneously increasing the voltage to which R3 is returned and thus increasing the current fed through R3.

The circuit for detecting when the pulse rate is above tolerance comprises a transistor T4 connected in a blocking oscillator circuit including a transformer TR1 connected to couple the collector to the base. The base of T4, whose emitter is earthed, is normally biased off by the voltage across a diode D4 supplied with current by a resistor R6 connected to +9 v. The output voltage on C3 is applied to the base of T4 via a diode D2 and a resistor R7. When the current supplied via R7 exceeds that supplied by R6, the base of T4 goes negative, and T4 conducts. T4 then operates as a 10 kc./s. blocking oscillator, D4 carrying the base current during the conducting half-cycle and D3 the base current which cuts off the transistor at the beginning of the non-conducting half-cycle. The collector current flows through a relay RA connected between the primary winding of TR1 and −15 v. A diode D5 connected across RA maintains the current in RA during the half-cycles when T4 is not conducting, and the mean current in RA is sufficient to energize the relay. A capacitor C4 connected between D5 and earth helps to smooth the current through RA.

The circuit for detecting when the pulse rate is below tolerance comprises a transistor T5 connected in a similar blocking oscillator circuit including a transformer TR2. In this case the base is earthed (from a D.C. viewpoint) and the emitter is biased off by the voltage across a diode D8 supplied with current by a resistor R8 connected to −15 v. The output across C3 is applied to the emitter of T5 via a diode D6 and a resistor R9. A relay RB shunted by a diode D9 is connected in the collector circuit.

In addition to the contacts S1/1, the switch S1 carries contact pairs S1/2 and S1/3 connected to short-circuit the secondary (base) windings of TR1 and TR2 respectively. Thus until the switch is operated to open S1/1 and start the counting period, neither the above-tolerance nor the below-tolerance detection circuit can operate. If the above-tolerance circuit is operated, a relay contact RA/1 connected in parallel with S1/1 closes to reset the integrating circuit, and a relay contact RA/2 closes to light an indicating lamp L1. RB is provided with contacts RB/1 and RB/2 having equivalent functions. As neither the primary nor secondary windings on TR1 and TR2 are damped, either detection circuit once triggered continues to oscillate despite the voltage on C3 being reset to zero by the closing of RA/1 or RB/1. Whichever relay is energised is only released when switch S1 is operated manually to close contacts S1/1, S1/2 and S1/3.

The detection levels are adjusted by varying the values of R6 and R8, which control the bias currents. Since $R7=R9=10K$, for RA or RB to be energized by ±5 v. on C3 (corresponding to a change of 5 counts on either side of the tolerance line) these currents are each adjusted to be about 0.5 ma.

If it is desired to limit the maximum duration of the counting period as previously described, the circuit can be suitably modified using means which are known to those skilled in the art. For example a timing circuit initiated when S1/1 is opened, can be used to terminate the count after a given time if neither detection circuit has been operated. The trend at that time can be determined by observing the polarity of the voltage on C3. Alternatively, decreasing instead of constant detection levels can be arranged by returning resistors R6 and R8 to circuits which generate sweep waveforms (e.g. circuits of the Miller time-base type) instead of to fixed voltages.

Other arrangements embodying the invention are possible. In some applications only an upper- or a lower-level detecting circuit may be required, not both, in conjunction with a count-time limiting circuit. Alternative forms of integrating and detecting circuits can be used, and valve circuits can be used instead of transistor circuits.

In other embodiments of the invention the store can be a digital store instead of a capacitor, e.g. of the Dekatron type, which is driven in one direction by the input pulses and in the opposite direction by emptying pulses, the store being initially set to, say, a half-full condition at the beginning of a count. Mechanical embodiments are also possible, e.g. by the use of a differential gear train, the movement of the planet carrier representing the changing level of the store.

I claim:

1. A ratemeter circuit for electrical pulses comprising a store for said pulses, means for emptying the store at a constant rate independent of the rate at which pulses are fed to said store, means for setting the store to an initial condition, and means for detecting when the nett stored pulse count has changed, in at least one direction, by a predetermined amount.

2. A ratemeter as claimed in claim 1 wherein said store is the storage capacitor of an electronic integrating circuit, said emptying means withdraws charge from said capacitor at a rate corresponding to the average rate of flow of charge into said capacitor at the given pulse rate, said setting means establishes an initial voltage across said capacitor, and said detecting means operates when the voltage on the capacitor has changed, in either direction, from said initial voltage to predetermined levels.

3. A ratemeter as claimed in claim 2 wherein said electronic integrating circuit is of the Miller type comprising a feedback loop including said capacitor, and said emptying means comprises a resistor connected to withdraw a constant current from said capacitor.

4. A ratemeter for electrical pulses comprising an electronic integrating circuit having a storage capacitor for charging by said pulses, means for discharging said capacitor at a constant rate independent of the rate at which pulses are fed to said capacitor, means for establishing an initial voltage across said capacitor, and means for detecting and indicating when the voltage across the capacitor has changed, in either direction, from said initial voltage to predetermined levels.

5. A ratemeter circuit for electrical pulses comprising a Miller-type electronic integrating circuit having a feedback loop including a storage capacitor for charging by said pulses, a resistor connected to draw a constant discharging current from said capacitor independent of the rate at which pulses are fed to said capacitor, and means for detecting and indicating when the voltage across the capacitor has changed, in either direction, from said initial voltage to predetermined levels.

References Cited in the file of this patent

UNITED STATES PATENTS 2,831,121     Zito _____ Apr. 15, 1958

OTHER REFERENCES

Millman and Taub, Pulse and Digital Circuits, page 217, McGraw-Hill, 1956.